No. 754,696.

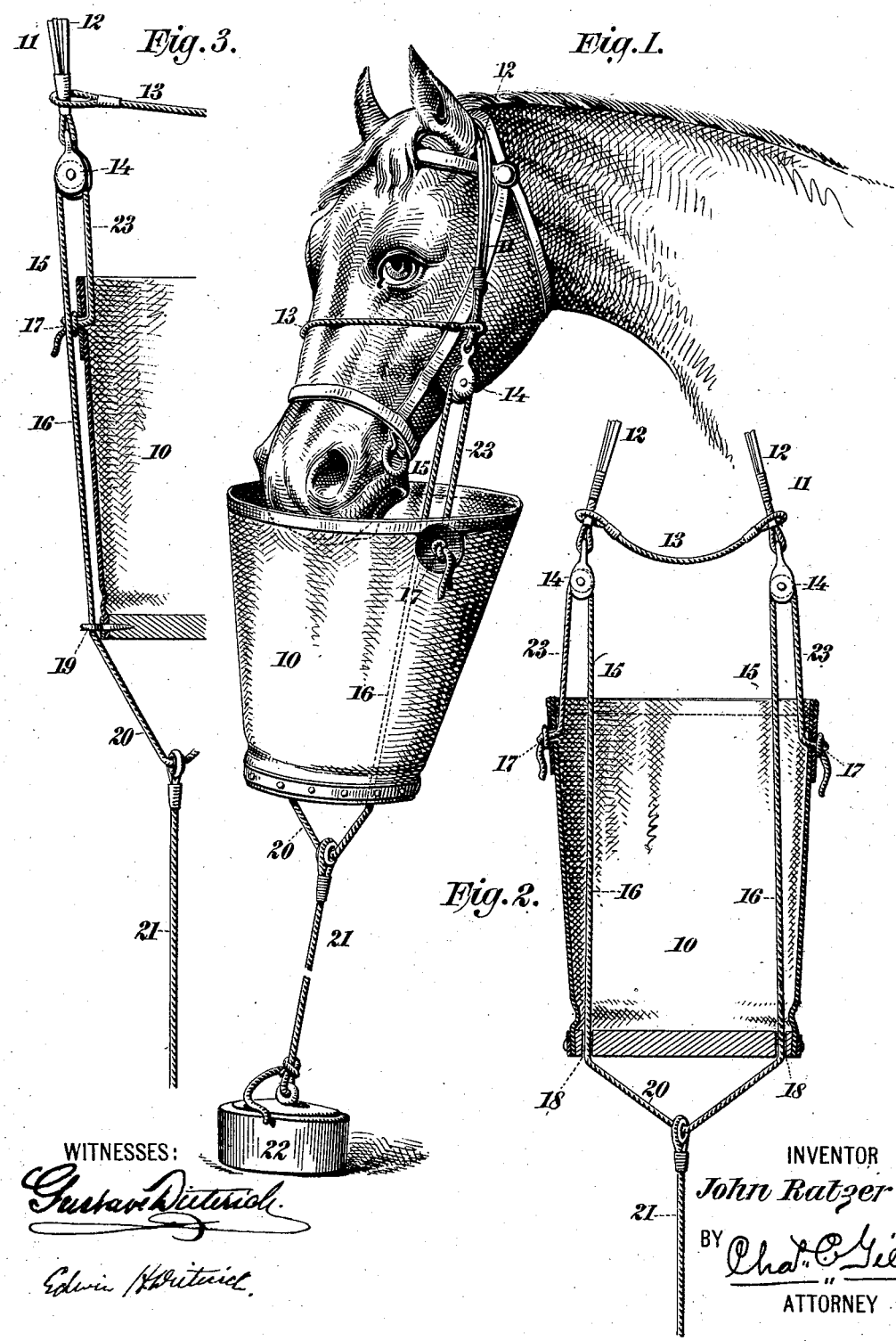

Patented March 15, 1904.

UNITED STATES PATENT OFFICE.

JOHN RATZER, OF NEW YORK, N. Y.

FEED-BAG FOR HORSES.

SPECIFICATION forming part of Letters Patent No. 754,696, dated March 15, 1904.

Application filed December 5, 1903. Serial No. 183,850. (No model.)

*To all whom it may concern:*

Be it known that I, JOHN RATZER, a citizen of the United States, and a resident of New York city, in the county of New York and State of New York, have invented certain new and useful Improvements in Feed-Bags for Horses, of which the following is a specification.

The invention relates to improvements in feed-bags for horses; and it consists in the novel features and combinations of parts hereinafter described and claimed.

The object of the invention is to provide a feed-bag which will be comfortable for the horse and so arranged that the horse will be able to reach all of his feed and not be able to cast the oats from the bag when throwing his head.

In carrying out my invention I provide a bag of any usual or suitable construction with means for suspending the same from the head of the horse and with means hereinafter described for effecting the upward movement of the bag in a substantially vertical line into closer relation to the mouth of the horse whenever the animal moves his head upwardly.

The invention and satisfactory means for carrying the same into effect will be understood from the detailed description hereinafter presented, reference being had to the accompanying drawings, in which—

Figure 1 is a perspective view of a feed-bag embodying my invention. Fig. 2 is a vertical section of same, partly broken away; and Fig. 3 is a like section of a portion of a feed-bag equipped with a modified form of my invention.

In the drawings, 10 designates the bag proper, which, except as to the features hereinafter pointed out as constituting my invention, may be of any usual or suitable form, construction, and material.

The bag 10 is provided with the hanger 11, composed of parts 12 13, adapted to the head of a horse, as shown, these parts 12 13 not being in themselves of unusual construction.

At the lower ends of the sides of the hanger 11 are suitable guides 14, preferably in the form of pulleys, through which are threaded the end portions of a rope or cord 15, the latter comprising as its essential parts the side members 16 16, which extend upwardly from below the bag 10 and thence through the guides 14, the upper extremities of these side members 16 being secured to the bag 10, preferably by simply being passed through holes 17 therein and knotted, as shown.

The aforesaid side members 16 may extend downwardly within the bag and through the holes 18 in the bottom thereof, as shown in Fig. 2, or downwardly along the outer side of the bag and through the eyes of screw-eyes 19, secured to the bottom of the bag, as shown in Fig. 3, as may be preferred, and said side members 16 will below the bag be connected together to form a loop 20 across the bottom of the bag, this loop being preferably formed by making the members 16 and loop 20 from one continuous piece of rope or cord, although obviously the members 16 might be in two separate pieces tied together below the bag, thus making the loop 20.

From the loop 20 a stay rope, strap, or cord 21 will be suspended, and this rope or cord 21 is employed as a means creating a resistance and preventing the looped rope or cord 15 from being bodily carried upwardly with the bag 10 when the horse moves his head upwardly. The lower end of the cord or rope 21 will when the bag is in use be fastened to something which will hold it against upward movement, and in the drawings I illustrate the lower end of the rope or cord 21 as fastened to a weight 22 of the character commonly carried in buggies. The rope or cord 21 may be fastened to the leg of the horse or to a pole of a wagon or to any other point of resistance, the sole purpose of thus fastening the rope or cord 21 being to firmly hold stationary the looped portion of the rope 15 during any upward movement of the bag 10.

The method of utilizing the invention may be understood upon reference to Fig. 1, in which it will be observed that if the horse should raise his head, the force thus exerted being resisted by the stay rope or cord 21, the bag 10 will slide upwardly toward the mouth of the horse, the side members 16 of the rope 15 at their upper portions slipping through the guides 14 of the hanger 11, and those portions of the rope or cord 15 designated by the numeral 23 at such time becoming shortened by their travel through said guides 14 and the loop 20 at such time becoming enlarged proportionately. When the horse raises his head, the bag 10 will therefore pass into closer relation to his mouth, so that he may reach the food in the lower part of the bag and not be compelled to toss the bag around and lose his oats. Upon the horse lowering his head the weight of the bag will be sufficient to cause it to slide downwardly, the upper portions of the rope or cord 15 then reversing their movement through the guides 14 and allowing the bag to again reach its lower position. (Illustrated in Fig. 1.) The fact that the side members 16 of the rope 15 are connected together across the bottom of the bag results in the bag having a uniform movement upwardly and downwardly, the resistance offered by the rope or cord 21 coming centrally upon the loop 20.

The primary relation of the bag to the head of the horse may be regulated at the time the stay-rope 21 is fastened to the weight or other fixed point, and this also is a feature of advantage.

In the first adjustment of the bag to the head of the horse the bag will be moved upwardly until the contents of the bag pass into comfortably-close relation to the mouth of the horse. Thereafter as the contents of the bag become consumed any upward movement of the head of the horse to throw the feed upwardly, which is a usual habit with horses, will result in the bag sliding upwardly and carrying the feed to the mouth of the horse.

It will be understood, therefore, that the features of my invention reside in the looped rope or cord 15 and stay rope or cord 21 when used in connection with the hanger 11, the parts being so disposed that the bag may travel upwardly into closer relation to the mouth of the horse as the latter raises his head.

The fact that the side members of the looped rope or cord 15 pass through the holes 18 or screw-eyes 19 aids in compelling the bag 10 to have a proper movement upwardly and downwardly, the said holes 18 or screw-eyes 19 affording guides for the rope 15 and being at the lower end of the bag. The guides for the side members of the rope 15 being at the bottom of the bag is also important, since by reason thereof and the employment of the stay-rope 21 the bag is prevented from having an undue swinging motion imparted to it when the horse moves his head.

The main purposes accomplished by my invention are that the bag is so supported and controlled that the horse may comfortably feed and that all danger of the oats being thrown out or spilled from the bag is avoided.

I may market the bag having the hanger 10 and looped rope 15, without the rope 21, the latter being applied by persons who may purchase the bag. The rope side members 16 16 may, as above indicated, be in separate pieces, and the lower ends of these pieces may be tied together either by the manufacturer or purchaser.

What I claim as my invention, and desire to secure by Letters Patent, is—

1. The feed-bag, and the hanger 11 therefor, the latter having guides 14, combined with the rope or cord 15 looped below the bag and having its side members extended upwardly and thence through said guides and fastened to the bag, and a stay-cord connected with said rope 15; substantially as set forth.

2. The feed-bag, and the hanger 11 therefor, the latter having guides 14, combined with the rope or cord 15 looped below the bag and having its side members extended upwardly and thence through said guides and fastened to the bag, and a stay-cord connected with said rope 15, said bag at its lower part having guides through which said side members pass; substantially as set forth.

3. The feed-bag, and the hanger 11 therefor, the latter having guides 14, combined with the rope or cord 15 looped below the bag and having its side members extended upwardly and thence through said guides and fastened to the bag, and a stay-cord connected with said rope 15, said bag in its bottom having the holes 18 through which said side members pass; substantially as set forth.

4. The feed-bag, and the hanger 11 therefor, the latter having guides 14, combined with the rope members 16 extending upwardly from below the bag and thence through said guides and thence secured to the bag, and means for securing said members to a point of resistance below the bag; substantially as set forth.

5. The feed-bag, and the hanger 11 therefor, the latter having guides 14, combined with the rope members 16 extending upwardly from below the bag and thence through said guides and thence secured to the bag, means for preventing said members from sliding unduly upwardly when the bag is suspended, and means for securing said members to a point of resistance below the bag; substantially as set forth.

Signed at New York, in the county of New York and State of New York, this 3d day of December, A. D. 1903.

JOHN RATZER.

Witnesses:
ARTHUR MARION,
CHAS. C. GILL.